C. W. ONDERKIRK.
SHAFT COUPLING.
APPLICATION FILED JULY 28, 1917.
1,261,278.
Patented Apr. 2, 1918.
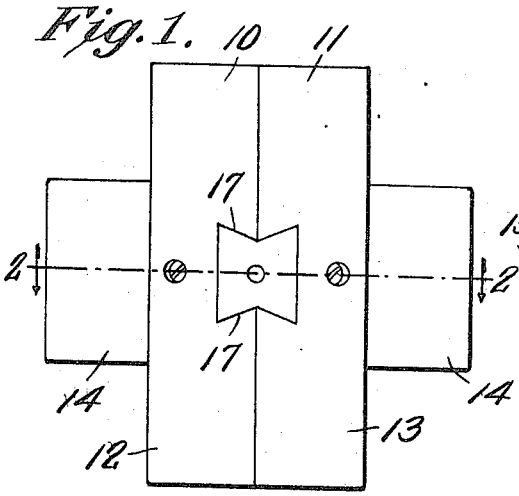
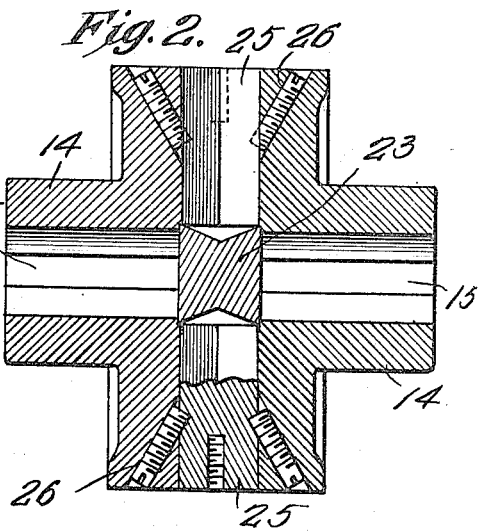
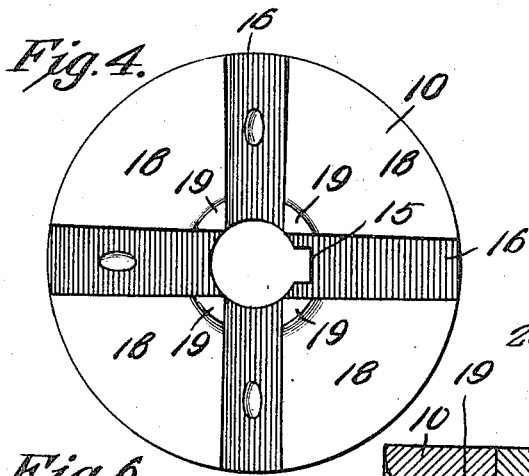
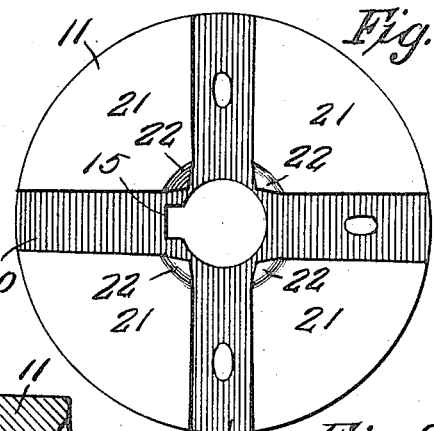
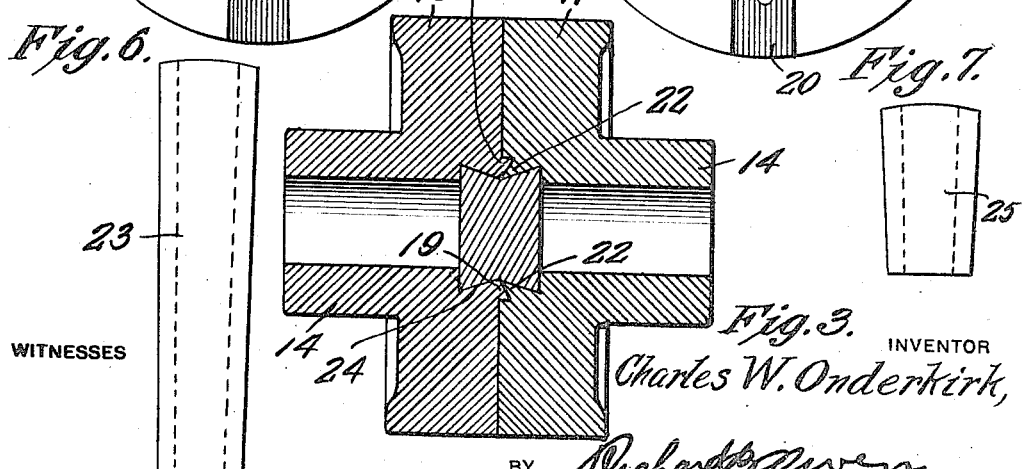
WITNESSES
James F. Crown,
Wm Beaman
INVENTOR
Charles W. Onderkirk,
BY Richard B. Owen,
ATTORNEY

UNITED STATES PATENT OFFICE.

CHARLES W. ONDERKIRK, OF DETROIT, MICHIGAN.

SHAFT-COUPLING.

1,261,278. Specification of Letters Patent. Patented Apr. 2, 1918.

Application filed July 28, 1917. Serial No. 183,247.

*To all whom it may concern:*

Be it known that I, CHARLES W. ONDERKIRK, a citizen of the United States, residing at Detroit, in the county of Wayne and State of Michigan, have invented certain new and useful Improvements in Shaft-Couplings, of which the following is a specification.

This invention has relation to shaft couplings, and has for an object to provide improvements in the flanged type of coupling whereby to enable the complementary members of the coupling to be securely held together without the use of bolts or the like.

Another object of the invention is to provide an improved shaft coupling of the type above described constructed in a manner to prevent sliding movement of the complementary members of the coupling relative to each other after the securing means for said members has been inserted.

A still further object of the invention is to provide an improved flanged shaft coupling in which the complementary members are constructed in a manner to permit securing thereof against relative movement by means of wedges which may be readily driven into place and as readily removed when the coupling is to be separated, but which are securely held in place against casual displacement.

A still further object of the invention is to provide a flange shaft coupling embodying means whereby the complementary member can be readily and accurately centered by merely bringing the members together.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Figure 1, is a view in side elevation of a flange coupling constructed in accordance with my invention.

Fig. 2, is a view thereof in transverse section.

Fig. 3, is a view similar to the preceding, the section however being taken on a plane at an angle of substantially 45° relative to the plane of the section of said preceding figure.

Fig. 4, is a view of one complementary member of the coupling illustrating the inner face thereof.

Fig. 5, is a similar view of the other member of the coupling.

Fig. 6, is a view of the long wedge, and

Fig. 7, is a view in detail of one of the short wedges.

With reference to the drawings, 10 and 11 indicate generally two complementary members of my improved shaft coupling, each comprising a discus flange 12 and 13 respectively formed centrally upon their outer faces with bosses 14 which are bored longitudinally to receive the ends of the shafts, and said bores provided with key-ways 15.

The member 10 shown in face view in Fig. 4 is provided upon its face opposite the face thereof bearing the boss 14, with a pair of diametrical grooves 16 which intersect at the center of the member and are at exactly right angles to each other. The grooves are furthermore undercut or dove-tailed as at 17, more clearly shown in Figs. 1 and 3. It will be seen that by the provision of the diametrical groove 16, four quadrant-shaped spaces 18 will be provided which appear as extensions of the front or inner face of the member. The corners of said quadrant shaped extensions 18 adjacent the center of the disk are furthermore formed with enlargements 19 which project beyond the face of the disk, shown in section in Fig. 3.

The complementary member 11 of the clutch is similarly provided upon its inner face with a pair of diametrical slots 20, at exactly right angles to one another and similarly to define four quadrant shaped extensions 21 on the face of the coupling. The corners of said quadrant shaped extensions 21 adjacent the center of the disk are however cut away as at 22 to receive the extensions 19 when the couplings are placed together with their inner faces in contact.

The members of the clutch are placed with their grooved faces in contact so that the central extensions 19 of the member 10 may be seated in the cut away portion 22 of the member 11 whereupon the grooves 16 and 20 of the members will coincide. A wedge 23 shown in detail in Fig. 6 is then inserted in a pair of the coinciding grooves. It will be noted from Figs. 2 and 3 that the wedge is provided upon opposite edges with longitudinally extending V-shaped cuts or recesses 24 which are shaped to fit the undercut grooves 16 and 20 whereby when the wedge is inserted separation of the members of the coupling is precluded. It will furthermore be noted that the wedge is slightly tapered from end to end, and the grooves 16 and 20 of the members to receive the same are correspondingly formed with tapering side walls. The wedge 23 is of a length to extend across the coupling from one side to the other. A pair of wedges 25, one of which is shown in Fig. 7 is then provided for insertion in the other coinciding groove 16 and 20 from opposite sides of the coupling. These grooves must also be tapered to receive the wedges 25 which are tapered from end to end to permit the wedges to be driven in place and to frictionally engage the walls of the groove to prevent displacement, and to more tightly engage the members of the coupling together. Substantially radial openings are formed in the periphery of each member of the coupling but at an angle to the flat plane thereof whereby to receive machine screws 26 which are inserted therein and which engage the wedges 23 and 25 to securely retain them against dislodgment.

It will be seen that the enlargements 19, fitting into the cutaway portions or recesses 22 serve to centralize the members of the coupling relative to each other, and also prevent relative movement of the members in a diametrical direction. As the wedges 23 and 25 are so shaped as to prevent separation of the members of the coupling it will be seen that the members of the coupling are thus tightly held in engagement without possibility of relative movement to throw the shaft out of alinement or otherwise damage the same.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. In a shaft coupling, a pair of flanges having their contacting faces grooved diametrically in two directions at relative right angles, a long wedge to enter a pair of coinciding grooves, and a pair of short wedges to enter other coinciding grooves from opposite sides of the coupling.

2. A shaft coupling including a pair of flanges for contact, each flange having its contacting face formed with a diametrical groove tapering from one end to the other, and a pair of diametrically extending grooves at angular relations to the first mentioned grooves, each of the second mentioned grooves tapering from the periphery of the flange to the center, a long wedge to enter the first mentioned grooves, to secure the flanges together, and a pair of short wedges to enter the second mentioned grooves from opposite sides of the coupling.

3. In a shaft coupling including flanges adapted for contact, one flange having centrally formed recesses, projections formed centrally on the flange to enter said recesses, to centralize the flanges but to permit relative rotation and removable means for securing the flanges against relative movement.

4. In a shaft coupling including flanges, adapted for contact, one flange having circumferentially spaced recesses adjacent the center thereof, correspondingly arranged projections on the central portion of the other flange to enter said recesses to centralize the flanges but to permit relative rotation, and means adapted to be subsequently associated with the flanges to secure the same against relative movement.

5. A shaft coupling including a pair of flanges adapted for contact, each having diametrical grooves intersecting at the center and defining portions projecting from the faces of the flanges, the inner corners of the said projecting portions of one flange being cut away to form recesses, projections formed on corresponding corners of the projections of the other flange to enter said recesses to centralize the flanges and to permit relative rotary movement thereof, and wedges to enter the grooves to lock the flanges against such movement.

In testimony whereof I affix my signature in presence of two witnesses.

CHARLES W. ONDERKIRK.

Witnesses:
WALTER DE SIMPEL,
JOHN WAWRZYNIAK.